US012603932B2

(12) United States Patent
Dingwell et al.

(10) Patent No.: US 12,603,932 B2
(45) Date of Patent: Apr. 14, 2026

(54) REMOTE DESKTOP INFRASTRUCTURE

(71) Applicant: IOXO, LLC, Salt Lake City, UT (US)

(72) Inventors: Seth Dingwell, Mooresville, NC (US); Ivan Escobar, Riverton, UT (US); Dylan F. Gale, Gahanna, OH (US); Michael P. Goulding, Highland, UT (US); Jacques Guibert de Bruet, Westerville, OH (US); Colin Kelly, Jr., Midvale, UT (US)

(73) Assignee: OMNIXIT, INC., Cottonwood Heights, UT (US)

( * ) Notice: Subject to any disclaimer, the term of this patent is extended or adjusted under 35 U.S.C. 154(b) by 0 days.

(21) Appl. No.: 16/921,657

(22) Filed: Jul. 6, 2020

(65) Prior Publication Data

US 2020/0336533 A1     Oct. 22, 2020

Related U.S. Application Data

(63) Continuation of application No. 16/559,375, filed on Sep. 3, 2019, now Pat. No. 10,708,338, which is a continuation of application No. 16/105,326, filed on Aug. 20, 2018, now Pat. No. 10,404,780, which is a (Continued)

(51) Int. Cl.
| | |
|---|---|
| *H04L 29/08* | (2006.01) |
| *G06F 9/455* | (2018.01) |
| *G06F 9/54* | (2006.01) |
| *G06F 21/00* | (2013.01) |
| *G06F 21/10* | (2013.01) |

| | |
|---|---|
| *G06Q 30/0601* | (2023.01) |
| *H04L 9/40* | (2022.01) |

(Continued)

(52) U.S. Cl.
CPC ........ *H04L 67/025* (2013.01); *G06F 9/45558* (2013.01); *G06F 9/54* (2013.01); *G06F 21/00* (2013.01); *G06F 21/10* (2013.01); *G06Q 30/0637* (2013.01); *H04L 63/102* (2013.01); *G06F 9/452* (2018.02); *G06F 2009/45587* (2013.01)

(58) Field of Classification Search
CPC ..... H04L 67/025; H04L 63/102; G06F 21/10; G06F 21/00; G06F 9/54; G06F 9/45558; G06F 9/4445; G06F 2009/45587; G06Q 30/0637
See application file for complete search history.

(56) References Cited

U.S. PATENT DOCUMENTS

| | | | | |
|---|---|---|---|---|
| 6,272,545 B1 * | 8/2001 | Flanagin | ............. | G06F 15/0225 |
| | | | | 709/227 |
| 8,010,676 B1 * | 8/2011 | Battersby | .............. | H04L 67/306 |
| | | | | 709/226 |

(Continued)

*Primary Examiner* — Nicholas P Celani
*Assistant Examiner* — Wuji Chen
(74) *Attorney, Agent, or Firm* — Kunzler Needham Hilton

(57) ABSTRACT

Apparatuses, systems, and methods are disclosed for a computer desktop infrastructure. A desktop module is configured to execute a computer desktop environment on a hardware device. A local storage module is configured to store application data for a computer desktop environment in local non-volatile storage of a hardware device executing the computer desktop environment. A remote module is configured to provide a computer desktop environment to a user over a network.

16 Claims, 5 Drawing Sheets

Related U.S. Application Data continuation of application No. 14/675,447, filed on Mar. 31, 2015, now Pat. No. 10,057,325.

(60) Provisional application No. 61/973,156, filed on Mar. 31, 2014.

(51) Int. Cl.
  *H04L 67/025* (2022.01)
  *G06F 9/451* (2018.01)

(56) References Cited

U.S. PATENT DOCUMENTS

| | | | | |
|---|---|---|---|---|
| 8,032,556 B1* | 10/2011 | Cook | G06F 16/957 | 715/745 |
| 8,555,274 B1* | 10/2013 | Chawla | G06F 9/45558 | 718/1 |
| 8,972,485 B1* | 3/2015 | French | G06F 9/5044 | 709/203 |
| 9,225,707 B1* | 12/2015 | de Sousa | H04L 63/08 | |
| 9,544,390 B1* | 1/2017 | Baird | H04L 67/306 | |
| 10,228,969 B1* | 3/2019 | Gupta | G06F 9/541 | |
| 10,511,674 B2* | 12/2019 | Xiao | G06F 9/452 | |
| 10,684,788 B1* | 6/2020 | Hasbe | G06F 11/2023 | |
| 11,487,572 B1* | 11/2022 | Sabin | H04L 67/10 | |
| 2005/0114711 A1* | 5/2005 | Hesselink | H04L 67/568 | 726/4 |
| 2007/0006218 A1* | 1/2007 | Vinberg | G06F 9/45558 | 717/174 |
| 2007/0078988 A1* | 4/2007 | Miloushev | H04L 67/10 | 709/227 |
| 2007/0174410 A1* | 7/2007 | Croft | G09G 5/14 | 709/208 |
| 2007/0174429 A1* | 7/2007 | Mazzaferri | H04L 63/102 | 709/218 |
| 2007/0220417 A1* | 9/2007 | Mathew | G06F 40/166 | 707/E17.116 |
| 2007/0233782 A1* | 10/2007 | Tali | G06F 8/61 | 709/220 |
| 2007/0245409 A1* | 10/2007 | Harris | H04L 67/06 | 726/5 |
| 2008/0098006 A1* | 4/2008 | Pedersen | H04L 67/63 | |
| 2008/0133501 A1* | 6/2008 | Andersen | G06F 16/9535 | 707/999.005 |
| 2009/0100448 A1* | 4/2009 | Baker, III | H04L 67/34 | 719/330 |
| 2009/0106571 A1* | 4/2009 | Low | G06F 9/5094 | 709/224 |
| 2009/0260005 A1* | 10/2009 | Nakagawa | H04L 67/34 | 717/177 |
| 2009/0275771 A1 | 11/2009 | Nickolov | | |
| 2009/0276771 A1* | 11/2009 | Nickolov | H04L 67/1029 | 718/1 |
| 2009/0313321 A1* | 12/2009 | Parsons | H04L 41/0253 | 709/203 |
| 2010/0070978 A1* | 3/2010 | Chawla | G06F 9/5077 | 718/105 |
| 2010/0257269 A1* | 10/2010 | Clark | G06F 9/4856 | 718/1 |
| 2011/0004680 A1* | 1/2011 | Ryman | G06F 9/452 | 709/227 |
| 2011/0004878 A1* | 1/2011 | Divoux | G06F 9/4856 | 718/1 |
| 2011/0022812 A1* | 1/2011 | van der Linden | H04L 69/08 | 711/E12.001 |
| 2011/0126047 A1* | 5/2011 | Anderson | H04L 63/08 | 709/224 |
| 2011/0131589 A1* | 6/2011 | Beaty | H04L 67/10 | 718/1 |
| 2011/0185292 A1* | 7/2011 | Chawla | G06F 9/5077 | 709/227 |
| 2011/0185355 A1* | 7/2011 | Chawla | G06F 9/45558 | 718/1 |
| 2011/0314389 A1* | 12/2011 | Meredith | G06F 8/60 | 709/201 |
| 2012/0066607 A1* | 3/2012 | Song | G06F 9/5077 | 715/737 |
| 2012/0079080 A1* | 3/2012 | Pishevar | A63F 13/332 | 709/220 |
| 2012/0084445 A1* | 4/2012 | Brock | G06F 9/5077 | 709/226 |
| 2012/0084775 A1* | 4/2012 | Lotlikar | G06F 9/45558 | 718/1 |
| 2012/0089666 A1* | 4/2012 | Goswami | G06Q 10/103 | 709/203 |
| 2012/0254111 A1* | 10/2012 | Carmichael | G06F 16/134 | 707/610 |
| 2012/0297311 A1* | 11/2012 | Duggal | H04L 67/025 | 715/740 |
| 2012/0304170 A1* | 11/2012 | Morgan | G06F 9/45558 | 718/1 |
| 2012/0311564 A1* | 12/2012 | Khalid | G06F 9/45558 | 718/1 |
| 2013/0036128 A1* | 2/2013 | Ben-Tsion | G06F 13/00 | 707/756 |
| 2013/0086580 A1* | 4/2013 | Simonsen | G06F 11/1407 | 718/1 |
| 2013/0166504 A1* | 6/2013 | Varkhedi | G06F 16/275 | 707/610 |
| 2013/0227564 A1* | 8/2013 | Asayama | G06F 16/176 | 718/1 |
| 2013/0262390 A1* | 10/2013 | Kumarasamy | H04L 41/0846 | 707/649 |
| 2013/0262638 A1* | 10/2013 | Kumarasamy | H04L 67/34 | 709/221 |
| 2013/0262801 A1* | 10/2013 | Sancheti | H04L 67/1097 | 711/162 |
| 2013/0282792 A1* | 10/2013 | Graham | G06F 9/452 | 709/203 |
| 2013/0282919 A1* | 10/2013 | Richards, III | H04L 67/1097 | 709/238 |
| 2013/0346465 A1* | 12/2013 | Maltz | G06F 9/5072 | 709/201 |
| 2014/0026057 A1* | 1/2014 | Kimpton | G06F 9/451 | 715/733 |
| 2014/0032959 A1* | 1/2014 | Dawkins | G06F 11/2056 | 714/E11.089 |
| 2014/0040446 A1* | 2/2014 | Cohen | G06F 9/5055 | 709/223 |
| 2014/0059375 A1* | 2/2014 | Mcelhoe | G06F 11/1484 | 714/E11.113 |
| 2014/0067917 A1* | 3/2014 | Kim | G06F 9/45558 | 718/1 |
| 2014/0372503 A1* | 12/2014 | Wang | H04L 67/06 | 709/201 |
| 2015/0095597 A1* | 4/2015 | Ayanam | G06F 3/065 | 711/162 |
| 2015/0188990 A1* | 7/2015 | Kacmarcik | H04L 67/51 | 709/203 |
| 2015/0281322 A1* | 10/2015 | Dingwell | G06F 9/54 | 715/740 |
| 2015/0304433 A1* | 10/2015 | Xiao | G06F 9/45533 | 709/203 |
| 2015/0339136 A1* | 11/2015 | Suryanarayanan | G06F 9/455 | 718/1 |
| 2015/0378704 A1* | 12/2015 | Davis | H04L 67/51 | 709/217 |
| 2016/0088066 A1* | 3/2016 | Thomas | H04L 67/148 | 709/224 |
| 2016/0274948 A1* | 9/2016 | Kelly | G06F 9/5077 | |
| 2016/0371104 A1* | 12/2016 | Zamir | G06F 9/45533 | |
| 2017/0111761 A1* | 4/2017 | Tarlton | H04W 4/80 | |
| 2017/0171300 A1* | 6/2017 | Natarajan | H04L 61/457 | |
| 2018/0102985 A1* | 4/2018 | Byers | H04L 47/83 | |
| 2018/0198886 A1* | 7/2018 | Zhang | H04L 67/125 | |

* cited by examiner

Endpoint Module
102

Desktop Module
202

Local Storage
Module
204

Remote Module
206

400

Begin

402    Execute Desktop Environment

404    Store Application Data in Local Endpoint Storage

406    Provide Desktop Environment to User

End

REMOTE DESKTOP INFRASTRUCTURE

CROSS-REFERENCES TO RELATED APPLICATIONS

This application is a continuation of U.S. patent application Ser. No. 16/559,375 entitled "REMOTE DESKTOP INFRASTRUCTURE" and filed on Sep. 3, 2019 for Seth Dingwell, et al., which is a continuation of U.S. patent application Ser. No. 16/105,326 entitled "REMOTE DESK-TOP INFRASTRUCTURE" and filed on Aug. 20, 2018 for Seth Dingwell, et al., which is a continuation of U.S. patent application Ser. No. 14/675,447 entitled "REMOTE DESK-TOP INFRASTRUCTURE" and filed on Mar. 31, 2015 for Seth Dingwell, et al. which claims the benefit of U.S. Provisional Patent Application No. 61/973,156 entitled "DESKTOPS-AS-A-SERVICE PLATFORM" and filed on Mar. 31, 2014 for David Turcotte, et al., each of which are incorporated herein by reference.

TECHNICAL FIELD

The present disclosure, in various embodiments, relates to computer desktops and more particularly relates to infrastructures for virtual computer desktops.

BACKGROUND

Accessing a computer desktop interface remotely can be a slow process. In addition to network throughput and latency issues between a data center and the end users, applications and system data for computer desktop interfaces may be stored remotely from the data center hardware actually executing the computer desktop interfaces, adding an extra layer of latency, slowing down remote computer desktop interfaces even more.

Due to the layers of latency typically involved in providing a remote computer desktop solution to multiple users, it can be difficult or impossible for a user to perform certain actions, such as playing a video or a computer game, using a remote desktop interface. For these reasons, users have been slow to adopt remote computer desktop solutions, preferring local solutions instead.

SUMMARY

Apparatuses are presented for a computer desktop infrastructure. In one embodiment, a desktop module is configured to execute a computer desktop environment on a hardware device. A local storage module, in certain embodiments, is configured to store application data for a computer desktop environment in local non-volatile storage of a hardware device executing the computer desktop environment. In a further embodiment, a remote module is configured to provide a computer desktop environment to a user over a network.

Systems are presented for a computer desktop infrastructure. In one embodiment, a management server hardware device that validates computer desktop credentials for a plurality of users. A plurality of endpoint hardware devices, in a further embodiment, each execute one or more instances of a computer desktop environment. In certain embodiments, a plurality of endpoint hardware devices store application data for one or more instances of a computer desktop environment in local non-volatile storage of endpoint hardware devices. Management server hardware, in one embodiment, hands off validated users to endpoint hardware devices and the endpoint hardware devices provide access to one or more instances of a computer desktop environment. One or more non-volatile storage devices, in certain embodiments, are remote from a plurality of endpoint hardware devices and store user data for a plurality of users for use in one or more instances of a computer desktop environment.

Methods are presented for a computer desktop infrastructure. A method, in one embodiment, includes accessing application data of one or more user applications of a plurality of remotely accessible virtual desktop environments from local non-volatile storage of one or more hardware devices executing the virtual desktop environments. In a further embodiment, a method includes accessing user data for one or more users of a plurality of remotely accessible virtual desktop environments from remote non-volatile storage that is not local to one or more hardware devices executing the virtual desktop environments. A method, in certain embodiments, includes providing one or more users with remote access to virtual desktop environments over a network.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. The disclosure may be practiced without one or more of the specific features or advantages of a particular embodiment. In other instances, additional features and advantages may be recognized in certain embodiments that may not be present in all embodiments of the disclosure.

These features and advantages of the present disclosure will become more fully apparent from the following description and appended claims, or may be learned by the practice of the disclosure as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention, and are not therefore to be considered to be limiting of its scope, the invention will be described and explained with additional specificity and detail through the use of the accompanying drawings, in which.

DETAILED DESCRIPTION

Figure 1:
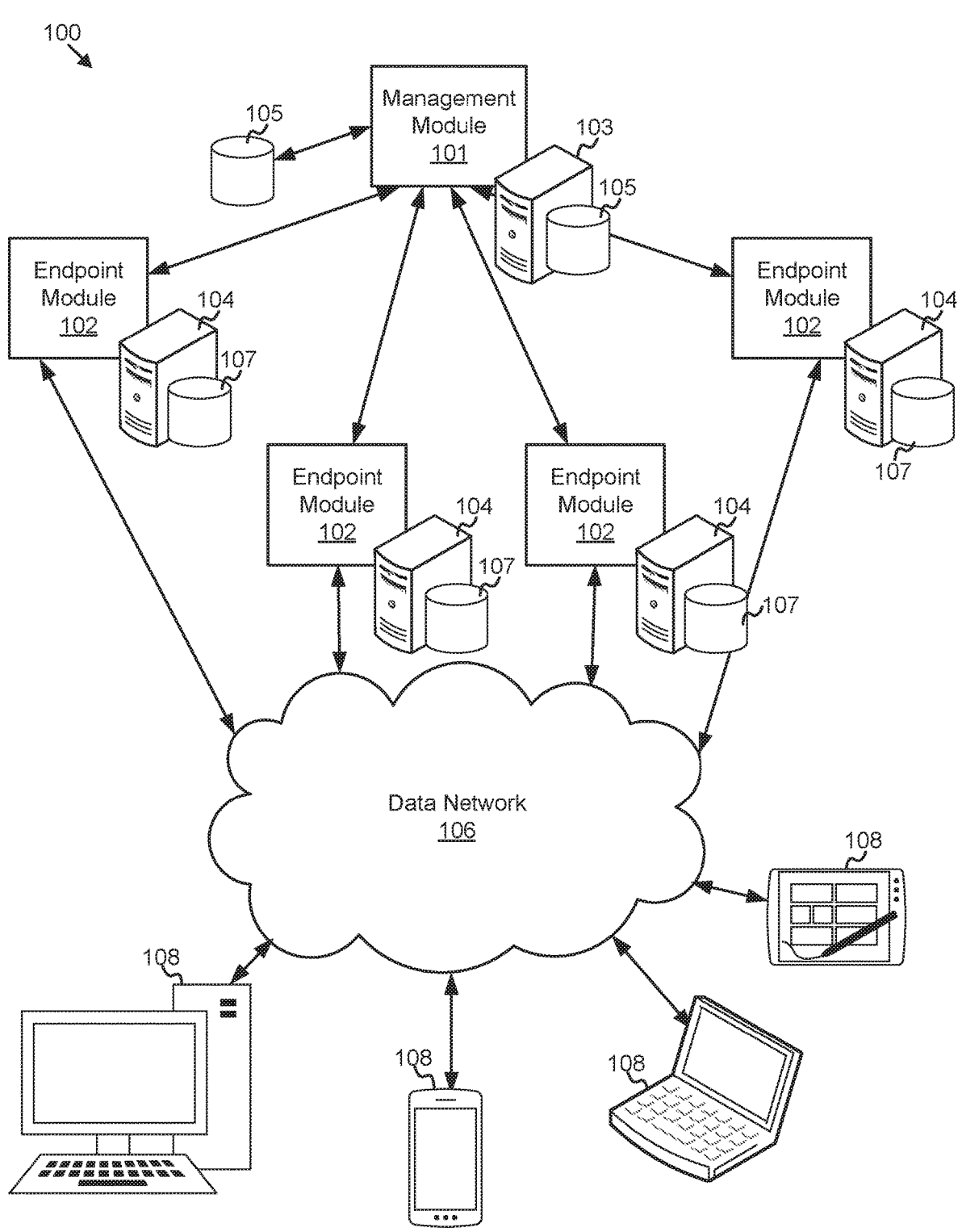
FIG. 1 is a schematic block diagram illustrating one embodiment of a system for a computer desktop infrastructure.

As will be appreciated by one skilled in the art, aspects of the present invention may be embodied as an apparatus, system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may be transmitted on a system or network. Where a module or portions of a module are implemented in software, the software portions are stored on one or more computer readable mediums.

Any combination of one or more computer readable medium(s) may be utilized. A computer readable storage medium may be, for example, but not limited to, an electronic, magnetic, optical, electromagnetic, infrared, or semi-conductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Aspects of the present invention are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the accompanying figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

FIG. 1 depicts one embodiment of a system 100 for a computer desktop infrastructure. The system 100, in the depicted embodiment, includes a management module 101 executing on management server hardware 103, one or more endpoint modules 102 executing on one or more endpoint hardware devices 104 with local non-volatile storage devices 107, one or more remote non-volatile storage devices 105, and one or more clients in communication with the one or more endpoint modules 102 over a data network 106.

The system 100, in certain embodiments, comprises an infrastructure for providing access to one or more computer desktop environments, or one or more instances thereof, to users of the one or more client devices 108 over the data network 106. The system 100 (e.g., the management module 101 and/or the one or more endpoint modules 102) may comprise a high performance, cloud-based subscription platform that makes cost effective computing available to users of the one or more client 108 computing devices or the like over the data network 106. The system 100 (e.g., the management module 101 and/or the one or more endpoint modules 102), in certain embodiments, makes services available without the level of complexity and substandard end-user experience that may otherwise be present.

In one embodiment, the system 100 (e.g., the management module 101 and/or the one or more endpoint modules 102) eliminates the complexity and thereby provides users of the client devices 108 reasons to migrate their desktop computer usage to the cloud (e.g., the system 100), due to ease of use, low latency, high performance, or the like. The system 100 (e.g., the management module 101 and/or the one or more endpoint modules 102), in certain embodiments, makes information technology (IT) management in the cloud so easy, that a non-technical user, such as a CEO or other management or business user, can do it. The system 100 (e.g., the management module 101 and/or the one or more endpoint modules 102), may provide an interface for clients 108 to deploy, manage, secure, and/or optimize the consumption of computing resources, thereby eliminating barriers that have slowed the migration of desktop computer usage to the cloud.

The system 100 (e.g., the management module 101 and/or the one or more endpoint modules 102) may comprise a Persona Automation and Management (PAM) platform. The system 100 (e.g., the management module 101 and/or the one or more endpoint modules 102) may be software-as-a-service (SaaS) based, may run in the cloud (e.g., over the data network 106), may be multi-tenant enabled for multiple simultaneous clients 108, and/or may manage a company's users, performance, software applications, or the like.

The management module 101 and/or the one or more endpoint modules 102, in one embodiment, may provide one or more analytics tools that deliver a user (e.g., a user of a client 108) insight into computing consumption, software licensing, employee efficiency, resource management, security, energy savings, and/or other usage analytics tracked and/or monitored by the management module 101 and/or the one or more endpoint modules 102, which may offer analytics and/or an ability to maximize a remote desktop experience enjoyed by users and/or clients 108.

The services provided by the system 100 (e.g., the management module 101 and/or the one or more endpoint modules 102), in one embodiment, may be substantially hardware agnostic (e.g., providing services to a plurality of different types of clients 108), may be fully and/or mostly accessible everywhere and anywhere on the data network 106, using a single login per user, or the like. The system 100 (e.g., the management module 101 and/or the one or more endpoint modules 102) may provide true cloud distributed desktop computing to the clients 108.

In one embodiment, the system 100 may provide a turnkey Desktops-as-a-Service (DaaS) Platform whereby one or more third-party providers may offer the services of the system 100 to clients 108 or other users of the third party provider (e.g., a data center, an Internet hosting provider, an Internet Service Provider (ISP), or the like). The system 100 may allow one or more third parties to offer different combinations of persistent and non-persistent desktops, desktop pools, and/or customize their customers' remote desktop computing experience based upon the particular needs of their use case, or the like.

The system 100, in one embodiment, may provide clients 108 with a private cloud (e.g., on premise, LAN accessible), a public cloud (e.g., off premise, WAN accessible, internet accessible), and/or both a private cloud and a public cloud. The system 100, in a further embodiment, may include customer support for users and/or clients 108. The system 100 may comprise a centralized management platform which, in certain embodiments, enables third party providers or the like to offer high-performance virtual desktops from the cloud in an easy, cost-effective, manner.

In one embodiment, the management module 101 performs one or more management functions for the system 100 and/or its users. While a single management module 101 is depicted, executing on a single server or other management server hardware 103, in other embodiments, the management module 101 may be disposed on and/or execute on multiple computer server hardware devices, may comprise multiple sub-modules configured for different tasks, or the like. For example, in various embodiments, the management module 101 may comprise and/or operate as a terminal server or terminal server manager that authenticates clients and enforces access rights; a remote desktop gateway that encapsulates a desktop environment session in another protocol (e.g., HTTP, HTTPS, TLS, or the like) for access over the internet or another data network 106; a remote desktop connection broker that maintains session information and distributes the load to the one or more endpoint hardware devices 104; a remote desktop licensing server to manage user licenses for operating systems, user applications, and/or other applications; or the like.

The management module 101, in certain embodiments, may validate or authenticate user credentials for remote desktop users accessing the management module 101 through the one or more clients 108. For example, the management module 101 may comprise a login subsystem and/or gateway, which may receive a username and password from one of a plurality of registered users requesting a remote desktop session using a client device 108. The management module 101 may validate or authenticate a user's credentials by referencing a user credential database, file, or other record to determine whether the received credentials (e.g., username and password) are correct.

The user's credentials, in certain embodiments, may be associated with an identifier for the user and/or a user's account, such as a username, a universally unique identifier (UUID), or another identifier. The management module 101 may determine the user's identifier, and may determine one or more permissions, licenses, preferences, and/or settings associated with the user based on the identifier. For example, the management module 101 may determine one or more operating system, user application, or other application licenses, permissions, preferences, and/or settings, which may be stored in a database or other data store in the one or more remote non-volatile storage devices 105, which may be remote to the endpoint hardware devices 104 but may be local or remote to the management server hardware 103.

Based on the one or more permissions, preferences, and/or settings, the management module 101 may allow a request from a user, deny a request from a user, or the like. The management module 101, in response to validating and/or authenticating that a user's credentials are correct, may assign a validated user to one of the multiple endpoint hardware devices 104. As described below, in certain embodiments, each endpoint hardware device 104 may be configured to execute multiple instances of a computer desktop environment (e.g., in virtual machines, natively, or the like) for different validated users.

The management module 101, in one embodiment, may select an endpoint hardware device 104, an instance of a computer desktop environment, one or more user applications, or the like for a user based on the one or more permissions, licenses, preferences, and/or settings associated with the user and/or the user's identifier (e.g., an operating system or operating system version; a number or type of processors or processor cores; an amount of volatile memory; an amount of non-volatile storage; a selection of one or more peripheral devices, real or virtual; one or more user applications; or the like), based on a geographic location of the user and of an endpoint hardware device 104, or the like. The management module 101 may assign a unique session identifier for the user's session, and provide it to the assigned endpoint module 102, or the like, may store session information (e.g., a session directory), may provide session recovery for resuming interrupted sessions, or the like.

In certain embodiments, the management module 101 may dynamically determine how many virtual remote desktop hosts each endpoint hardware device 104 concurrently executes, based on a current user load and/or an anticipated user load (e.g., based on historic trends, a time of day, or the like), and may dynamically increase or decrease the number of currently executing virtual remote desktop hosts over time. The management module 101 may ensure that the one or more endpoint hardware devices 104 and/or endpoint modules 102 execute more virtual and/or native remote desktop hosts at a given time than are needed for a number of users that are currently logged in, so that one or more new users may login and substantially immediately access a remote desktop environment provided by a remote desktop host, without substantially slowing or affecting other users, even in embodiments where a single remote desktop host may provide remote desktop environments for multiple users simultaneously.

The management module 101 and/or the one or more endpoint modules 102 may make user applications available to authenticated users of remote desktop environments executing on the endpoint hardware devices 104. However, in certain embodiments, instead of or in addition to storing applications and/or application data in the remote non-volatile storage devices 105 of the management server hardware 103 and/or an associated network, the management module 101 may store applications and/or application data in the local non-volatile storage devices 107 of the endpoint hardware devices 104. Storing applications and application data locally on the endpoint hardware devices 104 (e.g., in the local non-volatile storage devices 107) may allow the endpoint module 102 to execute one or more applications with minimal latency, allowing high definition video to play, computer games to execute smoothly, complex business applications to execute with little or no delay or stuttering, or the like, which may otherwise occur if the applications and/or associated data were not stored locally.

Because of the multiple users and clients 108, multiple endpoint hardware devices 104, and multiple desktop environments executing on the endpoint hardware devices 104, traditionally, applications, application data, and other components of the remote desktop infrastructure of the system 100 may be stored in the remote non-volatile storage devices 105 of the management server hardware 103 and/or an associated network. However, storing applications and application data remotely from the endpoint hardware devices 104 may introduce extra latency and delay in executing the applications and providing remote access to a desktop environment and to the associated applications. By storing applications and/or application data locally, in the non-volatile data storage 107 of the endpoint hardware devices 104, the management module 101 and/or the one or more endpoint modules 102 may reduce latency and may execute and provide remote access to applications at or near native speeds.

In one embodiment, the management server hardware 103 comprises one or more computing devices with a processor (e.g., one or more processor cores) and volatile memory (e.g., random access memory (RAM)), or the like. For example, the management server hardware 103 may comprise one or more rack-mounted servers in a data center of a service provider, one or more desktop computer devices, a dedicated hardware appliance device (e.g., a remote desktop network appliance) located on a local area network (LAN) of one or more client devices 108, or the like. The management server hardware 103 may execute computer program code of the management module 101 natively (e.g., on "bare metal"), in a virtual machine, or the like. The management server hardware 103 may comprise the one or more remote non-volatile storage devices 105 (e.g., remote from the one or more endpoint hardware devices 104), may be in communication with the one or more remote non-volatile storage devices 105 over a data network, or the like.

In one embodiment, the one or more endpoint modules 102 execute one or more computer desktop environments on the one or more endpoint hardware devices 104, for remote access by users of the one or more clients 108. The one or more endpoint modules 102 may store application data (e.g., computer executable program code of an application, application files, application settings, application media files, or the like) in the one or more local non-volatile storage devices 107 of the endpoint hardware devices 104. In certain embodiments, the one or more endpoint modules 102 may store user data in highly available, redundant storage, such as the one or more remote non-volatile storage devices 105, to ensure that the user data is not lost, or the like. The one or more endpoint modules 102 are described in greater detail below with regard to FIGS. 2 and 3.

In one embodiment, the one or more endpoint hardware devices 104 comprise one or more computing devices with a processor (e.g., one or more processor cores) and volatile memory (e.g., random access memory (RAM)), or the like. For example, the one or more endpoint hardware devices 104 may comprise one or more rack-mounted servers in a data center of a service provider, one or more desktop computer devices, one or more dedicated hardware appliance devices (e.g., remote desktop network appliances) located on a local area network (LAN) of one or more client devices 108, or the like. The one or more endpoint hardware devices 104 may execute computer program code of the one or more endpoint modules 102 natively (e.g., on "bare metal"), in a virtual machine, or the like. The one or more endpoint hardware devices 104 comprise the one or more local non-volatile storage devices 107, as described in greater detail below.

The one or more endpoint hardware devices 104, in one embodiment, are co-located with the management server hardware 103 (e.g., in a data center of a remote desktop service provider, on a LAN with the one or more client devices 108, or the like). In a further embodiment, the one or more endpoint hardware devices 104 may comprise the same one or more hardware devices as the management server hardware 103 (e.g., the same rack, the same server, or the like), with the management module 101 and the one or more endpoint modules 102 executing on the same one or more hardware devices either natively, in one or more virtual machines, or the like.

In another embodiment, the one or more endpoint hardware devices 104 are located remotely from the management server hardware device 103 and/or each other (e.g., on different LANs, in a different data center, in a different geographical location, or the like), and may be in communication over a data network (e.g., the data network 106, the internet or another wide area network (WAN), a virtual private network (VPN), or the like). For example, in certain embodiments, one or more of multiple endpoint hardware devices 104 may be located in different geographical locations, different data centers, on site at different service providers, or the like. The management module 101, in certain embodiments, may select an endpoint module 102 and associated endpoint hardware device 104 for assigning a user based at least in part on the user's geographic proximity to the selected endpoint hardware device 104. The management module 101, in one embodiment, may account for local disasters (e.g., natural disasters, weather, illness, fire) by making multiple management hardware devices 103 and/or multiple endpoint hardware devices 104 available in different geographical locations.

The one or more computer desktop environments may execute natively on the one or more endpoint hardware devices 104 (e.g., on "bare metal") and/or in a virtual machine on the one or more endpoint hardware devices 104. In certain embodiments, one or more instances of the computer desktop environments may execute natively on the one or more endpoint hardware devices 104 while one or more other instances of the computer desktop environments execute in one or more virtual machines on the one or more endpoint hardware devices 104. The one or more endpoint modules 102 and/or the management module 101, in one embodiment, may migrate an instance of a computer desktop environment from executing in a virtual machine to executing natively on an endpoint hardware device 104, or vice versa, in response to a trigger, as described in greater detail below with regard to the migration module 308 of FIG. 3.

The one or more endpoint modules 102 may make one or more services (e.g., a remote computer desktop environment, a user management interface, one or more applications, an application catalogue, or the like) available to the clients 108 over the data network 106 as one or more of a computer application, a mobile application, an application programming interface (API), a website, a web application, or the like. The data network 106, in certain embodiments, connects the one or more endpoint modules 102 and the one or more clients 108, facilitating data communications between them. The data network 106 may comprise a global data network or WAN such as the Internet, a local data network or LAN (e.g., the management hardware device 103 and/or one or more of the endpoint hardware devices 104 may comprise one or more hardware appliances, local servers, or the like on the LAN with a client device 108), or another type of data network. The data network 106 may be wireless and/or wired, and may be configured to deliver data and services from the one or more endpoint modules 102 to users of the one or more client devices 108.

In one embodiment, the one or more local non-volatile storage devices 107 and/or the one or more remote non-volatile storage devices 105 may comprise magnetic storage (e.g., a hard disk drive), solid-state storage (e.g., NAND flash, phase-change RAM (PRAM), or the like), optical storage, and/or another non-volatile recording device. The one or more local non-volatile storage devices 107 are installed on an endpoint hardware device 104. For example, a local non-volatile storage device 107 may be installed on a local bus of an endpoint hardware device 104, such as a peripheral component interconnect (PCI) or PCI express (PCIe) bus, a serial bus (e.g., serial ATA (SATA), serial attached small computer system interface (SCSI) (SAS), or the like), a parallel bus (e.g, parallel ATA (PATA), parallel SCSI, or the like), universal serial bus (USB), or another local connection with an endpoint hardware device 104. The one or more remote non-volatile storage devices 105 are not local to and are not installed on an endpoint hardware device 104, but may instead be installed on and local to the management server hardware device 103, may comprise network attached storage (NAS), a storage area network (SAN), or other remote storage accessible to the one or more endpoint hardware devices 104 and/or the management server hardware device 103.

Because the one or more local non-volatile storage devices 107 are local to the one or more endpoint hardware devices 104, the endpoint module 102 may access data on the one or more local non-volatile storage devices 107 more quickly, with less latency, or the like than data stored in the one or more remote non-volatile storage devices 105. In certain embodiments, the management module 101 and/or the one or more endpoint modules 102 may store application data for remotely accessible desktop environments in the one or more local non-volatile storage devices 107. The management module 101 and/or the one or more endpoint modules 102, in a further embodiment, may store one or more applications and/or associated data in a local non-volatile storage device 107 of an endpoint hardware device 104, even if the one or more stored applications are not installed for a user, not accessible to a user, or restricted from a user of a remotely accessible desktop environment executing on the endpoint hardware device 104, so that the user may quickly access the application if selected and/or purchased from an application catalogue or the like, as described in greater detail below with regard to the application catalogue module 304 of FIG. 3.

In one embodiment, the management module 101 and/or the one or more endpoint modules 102 store user data in the one or more remote non-volatile storage devices 105. The one or more remote non-volatile storage devices 105 may comprise highly available, redundant storage, so that the user data is not lost or corrupted, even if an endpoint hardware device 104 fails, even if one or more disks or devices of the one or more remote non-volatile storage devices 105 fails, or the like. For example, in certain embodiments, the one or more remote non-volatile storage devices 105 may comprise an array of multiple, redundant storage devices (e.g., a redundant array of independent disks (RAID) array; multiple RAID arrays; one or more RAID 1, RAID 5, or RAID 6 arrays; one or more dual-head storage devices; one or more highly available storage (HAST) protocol devices; one or more network block devices; one or more distributed replicated block devices (DRBD); or other mirrored, replicated, and/or redundant storage).

In this manner, in certain embodiments, if an endpoint hardware device 104 fails while executing a computer desktop environment for a user, the user may simply log back in and continue to access the same user data in another instance of the computer desktop environment, executing on a different endpoint hardware device 104, without the loss of any user data. In a further embodiment, in response to failing to detect a ping, heartbeat, or another status indicator from a failed endpoint module 102 and/or endpoint hardware device 104, another endpoint module 102 and/or endpoint hardware device 104 may automatically resume the user's session based on the user data in the one or more remote non-volatile storage devices 105 and the application data stored in local non-volatile storage 107 of the other endpoint module 102, with little or no delay so that the transition is substantially seamless to a user.

The one or more local non-volatile storage devices 107 of the one or more endpoint hardware devices 104, in certain embodiments, do not store user data for the users of the clients 108, since the user data is stored in the one or more remote non-volatile storage devices 105. In a further embodiment, the one or more local non-volatile storage devices 107 may cache or store a redundant copy of at least a portion of the user data. The one or more remote non-volatile storage devices 105, in certain embodiments, do not store the application data stored in the one or more local non-volatile storage devices 107, store a redundant or backup copy of the application data stored in the one or more local non-volatile storage devices 107, or the like.

In one embodiment the one or more clients 108 each comprise a network connected device, such as the depicted desktop computer, laptop computer, mobile telephone device, and tablet computing device. The one or more clients 108 are each configured to send and receive data over the data network 106, to send requests to the one or more endpoint modules 102 and/or the management module 101, to receive data from the one or more endpoint modules 102 and/or the management module 101, or the like. The one or more clients 108 may be located in various locations throughout the data network 106.

The one or more clients 108, in certain embodiments, may comprise a thin client or portal used to access a remote computer desktop environment executing on an endpoint hardware device 104. In a further embodiment, the one or more clients 108 may comprise a client or portal computer application which may be executed on a client computing device 108 to access a remote computer desktop environment executing on an endpoint hardware device 104. In another embodiment, the one or more clients 108 may comprise a web browser computer application which may be executed on a client computing device 108 to access a remote computer desktop environment executing on an endpoint hardware device 104.

A client 108 may be configured to display a graphical user interface (GUI) of a computer desktop interface executing on an endpoint hardware device 104 to a user (e.g., as video comprising a computer desktop interface streamed from an endpoint hardware device 104, as a locally decoded and rendered computer desktop GUI based on information from an endpoint module 102 defining a state of a computer desktop interface executing on an endpoint hardware device 104, or the like). A client 108 may provide input from one or more user input devices (e.g., a keyboard, a mouse, a touch screen, a trackpad, a camera, or the like) to an endpoint module 102 and/or an endpoint hardware device 104 as input to the remote computer desktop interface accessed by the client 108. Data transmitted between a client 108 and an endpoint module 102 and/or the management module 101 may be encrypted or otherwise secured for purposes of privacy and/or security.

Figure 2:
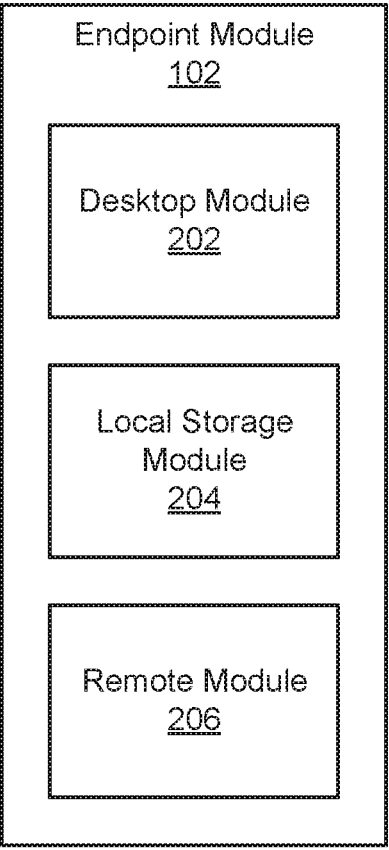
FIG. 2 is a schematic block diagram illustrating one embodiment of an endpoint module.

FIG. 2 depicts one embodiment of an endpoint module 102. The endpoint module 102, in the depicted embodiment, includes a desktop module 202, a local storage module 204, and a remote module 206. While the desktop module 202, the local storage module 204, and the remote module 206 are depicted as part of the endpoint module 102, in certain embodiments, at least a portion of one or more of the desktop module 202, the local storage module 204, and the remote module 206 may be part of the management module 101.

In one embodiment, the desktop module 202 is configured to execute a computer desktop environment on an endpoint hardware device 104. For example, the desktop module 202 may initiate execution of an instance of a computer desktop environment in response to the management module 101 handing off a validated and/or authenticated user to the desktop module 202. As described above, the management module 101, in certain embodiments, may provide a user identifier, a session identifier, or the like to the desktop module 202 in response to validating a user's credentials. The desktop module 202, in one embodiment, comprises one or more remote desktop hosts, remote desktop service providers, or the like.

As used herein, a computer desktop environment and/or an instance of a computer desktop environment comprises a GUI for an operating system, in which one or more other computer applications may be accessed or run. A computer desktop environment may comprises one or more icons, windows, toolbars, folders, wallpapers, widgets, menus, taskbars, settings, or the like which a user may manipulate or with which the user may interact. A computer desktop environment may comprise a window manager and/or a windowing system which may display executing applications within different windows, full screen, or the like. Examples of computer desktop environments include Microsoft Windows® (e.g., Luna or Aero desktop interfaces, or the like), Apple OS X® (e.g., Aqua desktop interface), Unix® or Linux® X Window System (e.g., KDE, GNOME, Xfce, Unity, or the like), and other desktop environments.

In certain embodiments, the desktop module 202 executes multiple instances of a computer desktop environment in virtual machines (e.g., an emulation of a computer system or computing device) on an endpoint hardware device 104. For example, the desktop module 202 may use one or more different virtualization techniques (e.g., direct virtualization of underlying hardware of an endpoint hardware device 104, emulation of a different computer system, operating system level virtualization, hardware-assisted virtualization, or the like). In this manner, in certain embodiments, the desktop module 202 may execute multiple instances of a computer desktop environment for different users on a single endpoint hardware device 104.

The desktop module 202 may comprise or cooperate with a hypervisor or virtual machine monitor to execute computer desktop environments in virtual machines and to manage execution of one or more guest operating systems comprising the computer desktop environments. The desktop module 202 may use a type 1 hypervisor which runs directly or natively on an endpoint hardware device 104 (e.g., a "bare metal" hypervisor), a type 2 hypervisor which runs within or is hosted by a host operating system, or a hybrid combination of type 1 and type 2 hypervisors.

The desktop module 202, in certain embodiments, may execute one or more instances of a computer desktop environment natively on an endpoint hardware device 104. For example, the desktop module 202 may execute a computer desktop environment natively on an endpoint hardware device 104 (e.g., on "bare metal"), without a hypervisor or virtual machine. In a further embodiment, the desktop module 202 may execute multiple instances of a computer desktop environment natively on an endpoint hardware device 104 (e.g., on "bare metal") using a type 1 native or "bare metal" hypervisor. As described below with regard to the migration module 308 of FIG. 3, in certain embodiments, the migration module 308 may migrate or transition an instance of a computer desktop environment (e.g., a session) from executing in a virtual machine to executing natively on an endpoint hardware device 104 in response to a trigger.

The desktop module 202, as described below with regard to the local storage module 204 and the user data module

302, may execute a computer desktop interface using application data stored in local non-volatile storage 107 of the one or more endpoint hardware devices 104, while using user data stored in remote non-volatile storage 105. For example, the desktop module 202, in response to the management module 101 handing off a validated user for a remote computer desktop session, may initiate the remote computer desktop environment using application data from the local non-volatile storage 107 of the associated endpoint hardware device 104 and may make the user data from the remote non-volatile storage device 105 available within the remote computer desktop environment, may configure the remote computer desktop environment according to or based on the user data from the remote non-volatile storage device 105, or the like.

In one embodiment, the local storage module 204 is configured to store application data for a computer desktop environment in local non-volatile storage 107 of an endpoint hardware device 104 executing the computer desktop environment. In certain embodiment, application data comprises computer executable program code of one or more applications for the computer desktop environment, such as computer executable program code of one or more user applications executable within the computer desktop environment, computer executable program code of infrastructure for providing the computer desktop environment to a remote user (e.g., a virtual storage device file such as a virtual hard disk (VHD) file, a remote desktop services stack, a domain controller, a system configuration management server, a file server, an application server, or the like), computer executable program code of an operating system providing the computer desktop environment or of the computer desktop environment itself, or the like. In certain embodiments, computer executable program code of infrastructure for providing the computer desktop environment to a remote user (e.g., one or more of a virtual storage device file such as a virtual hard disk (VHD) file, a remote desktop services stack, a domain controller, a system configuration management server, a file server, an application server, or the like) are both stored locally in the local non-volatile storage device 107 and executed locally on an endpoint hardware device 104, instead of being executed on a management hardware device 103, increasing latency for providing remote access to a computer desktop environment.

As described above, to provide multiple instances of a computer desktop environment to different users, using multiple endpoint hardware devices 104, VHD files and/or other application data is traditionally stored in remote data storage 105 that is not local to the endpoint hardware devices 104 executing the instances of the computer desktop environment. However, while such remote storage provide redundancy and provide a consistent user experience across the different endpoint hardware devices 104, the added latency of the remote storage 105 can have a negative impact on a user's experience, making the smooth playing of video or computer games difficult or impossible. The local storage module 204, in certain embodiments, reduces such latency by storing certain application data locally, in the local non-volatile storage 107 of the one or more endpoint hardware devices 104 executing a remotely available computer desktop environment.

In certain embodiments, to provide redundancy and/or a consistent experience across the one or more endpoint hardware devices 104, while storing application data in the local non-volatile storage 107, the local storage module 204 may periodically (e.g., in response to an application data update or another trigger; daily, weekly, monthly, or on another predefined schedule; or the like) synchronize or update the application data. For example, the local storage module 204 may receive one or more updated application data packages from the management module 101, from a different endpoint module 102, or the like. In a further embodiment, as described below with regard to the application catalogue module 304, the local storage module 204 may store application data in the local non-volatile storage 107 even for one or more application not currently selected, installed, or otherwise accessible to a user of a computer desktop environment, so that the one or more applications are instantly or quickly available to the user should the user select the one or more applications (e.g., purchase the one or more applications, purchase a license for the one or more applications, or the like).

In one embodiment, the remote module 206 is configured to provide access to and/or a view of a computer desktop environment and/or an instance thereof to a user (e.g., a user of a client device 108) over the data network 106. The remote module 206, in certain embodiments, encodes a view of a computer desktop environment as video and streams the video to a client device 108 over the data network 106 for viewing by a user. In a further embodiment, the remote module 206 sends a client device 108 one or more instructions, events, coordinates or positions, or other GUI information for a computer desktop environment, and the client device 108 decodes the received GUI information and renders a view of the computer desktop environment. The remote module 206 may encrypt or otherwise secure or protect the data (e.g., video, GUI information, or the like) sent to the one or more client devices 108 for purposes of privacy and/or security.

Figure 3:
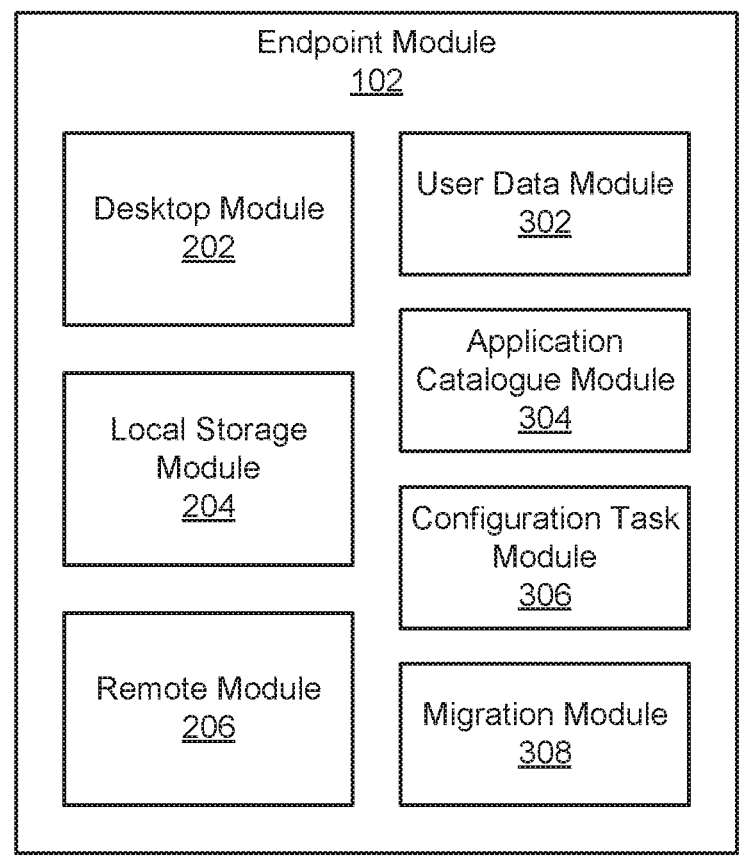
FIG. 3 is a schematic block diagram illustrating another embodiment of an endpoint module.

FIG. 3 depicts another embodiment of an endpoint module 102. The endpoint module 102, in the depicted embodiment, includes a desktop module 202, a local storage module 204, and a remote module 206, and further includes a user data module 302, an application catalogue module 304, a configuration task module 306, and a migration module 308. The desktop module 202, the local storage module 204, and the remote module 206, in certain embodiments, may be substantially similar to the desktop module 202, the local storage module 204, and the remote module 206 described above with regard to FIG. 2. While the desktop module 202, the local storage module 204, the remote module 206, the user data module 302, the application catalogue module 304, the configuration task module 306, and the migration module 308 are depicted as part of the endpoint module 102, in certain embodiments, at least a portion of one or more of the modules 202, 204, 206, 302, 304, 306, 308 may be part of the management module 101.

In one embodiment, the user data module 302 is configured to store data associated with a user of a computer desktop environment (e.g., user data) in highly accessible, redundant storage 105 that is not local to the endpoint hardware device 104 executing the computer desktop environment. As used herein, user data may comprise one or more of a user's settings or preferences (e.g., for a computer desktop environment or operating system thereof), session information, documents or other files (e.g., word processing files, spreadsheet files, photos, videos, music, downloads, or the like), application settings or logs, or other data associated with a user.

In one embodiment, the user data module 302 stores user data in the one or more remote non-volatile storage devices 105 or other highly available, redundant storage, so that the user data is not lost or corrupted, even if an endpoint hardware device 104 fails, even if one or more disks or devices of the one or more remote non-volatile storage devices 105 fails, or the like. As described above, in certain embodiments, if an endpoint hardware device 104 fails while executing a computer desktop environment for a user, the user may simply log back in and continue to access the same user data in another instance of the computer desktop environment, executing on a different endpoint hardware device 104, without the loss of any user data.

The user data module 302, in certain embodiments, does not store user data for the users of the clients 108 in the one or more local non-volatile storage devices 107 of the one or more endpoint hardware devices 104, since the user data is stored in the one or more remote non-volatile storage devices 105. In a further embodiment, the user data module 302 may cache or store a redundant copy of at least a portion of the user data in one or more local non-volatile storage devices 107, in volatile memory of an endpoint hardware device 104, or the like. The user data module 302, may ensure that the user data is available to each of the endpoint hardware devices 104, so that any one of the endpoint hardware devices 104 may provide a computer desktop environment to a user, with the user's own data.

In one embodiment, the application catalogue module 304 is configured to present an interface for a user to select an application for installing in a computer desktop environment. The application catalogue module 304, in various embodiments, may present the interface as an application executable within a computer desktop environment for selecting and installing applications, as a website or web application for selecting applications for installation using a web browser, or the like. The application catalogue module 304, for example, may present a grid of selectable applications to a user, with detail screens for each application with additional information and a button or other GUI element to trigger installation of the application.

As described above, the local storage module 204, in certain embodiments, may be configured to store one or more selected applications in the local non-volatile storage 107 of the endpoint hardware device 104 prior to selection of the one or more applications by the user for installation. For example, the local storage module 204 may store application data for each application of the application catalogue, for a subset of the applications of the application catalogue (e.g., N most popular applications), or the like in the local non-volatile storage 107 of each of the endpoint hardware devices 104.

The application catalogue module 304, in one embodiment, is configured to query a supervisor of a user which has selected an app, for authorization from the supervisor to purchase the selected application. In certain embodiments, the application catalogue module 304 may send an email or another message to the supervisor with one or more clickable links to authorize or deny the purchase of a selected application. In a further embodiment, where the supervisor is also a user of a computer desktop interface provided by an endpoint module 102, the application catalogue module 304 may query the supervisor from within the supervisor's instance of the computer desktop interface, using a popup message or notification, or the like, with one or more buttons, links, or other GUI elements to allow the supervisor to authorize or deny the purchase of a selected application.

The application catalogue module 304, in one embodiment, is configured to purchase a license for a selected application from a third party in response to receiving authorization from a supervisor. The application catalogue module 304 may track and manage software licenses for an entity (e.g., a corporation or other business, a user, a family), and may be configured to only purchase a license, to only request supervisor authorization, or the like, when an existing license for selected software is not available (e.g., each purchased license is currently in use, no license has been purchased, or the like). As described below with regard to the configuration task module 306, in certain embodiments, querying a supervisor for authorization, purchasing a software license from a third party, or the like, may comprise an automated, executable task of the configuration task module 306, which the application catalogue module 304 may trigger or execute in cooperation with the configuration task module 306.

In one embodiment, the configuration task module 306 is configured to provide a library of one or more automated, executable tasks for managing different remote users of instances of a computer desktop environment. The configuration task module 306, in one embodiment, provides or presents the library using a web interface (e.g., a website, a web application, or the like). In a further embodiment, the configuration task module 306 provides or presents the library as an application and/or GUI within a remotely accessible computer desktop interface.

The configuration task module 306 may present a library of tasks for user management, enterprise management of multiple computer desktop environments or instances thereof, or the like, for entities with multiple users of the system 100 described above. Some of these tasks may otherwise require a user to complete multiple forms or other requests, to receive authorization from multiple parties, to wait for an administrator to manually setup or configure several different accounts and/or applications, or the like.

For example, in one embodiment, one of the automated, executable tasks provided by the configuration task module 306 comprises an automated workflow for onboarding a new user of a computer desktop environment, or instance thereof. The configuration task module 306 may receive one or more of a name, a department, an email address, a user picture, an application set (e.g., a list of requested and/or authorized applications), for a new user from the new user, from an administrator, from a supervisor of the new user, or the like.

In a further embodiment, the configuration task module 306 may import user information from a user's exiting account, such as an operating system user account or profile for the user on a client hardware device 108, a social media account, or the like. The configuration task module 306 may query the user for credentials or authorization to access the user's existing account. In certain embodiments, the configuration task module 306 may scan the data network 106, a LAN of a client hardware device 108, a client hardware device 108 itself, or the like and discover available user accounts and present a listing of the discovered user accounts to the user, allowing the user to select the associated account. The configuration task module 306 may collect one or more settings, preferences, a name, an email address, a user picture, a department or company, an application set, user data files, or the like from the user's existing account and may import the collected data into a new account for the user for use with the desktop environments of the endpoint module 102, executing on the one or more endpoint hardware devices 104.

The configuration task module 306 may query a manager of the new user for authorization to onboard the new user. For example, the configuration task module 306 may send an email or another message to the supervisor with one or more clickable links to authorize or deny onboarding of the new user. In a further embodiment, where the supervisor is also a user of a computer desktop interface provided by an endpoint module 102, the configuration task module 306 may query the supervisor from within the supervisor's instance of the computer desktop interface, using a popup message or notification, or the like, with one or more buttons, links, or other GUI elements to allow the supervisor to authorize or deny onboarding of the new user.

In response to the supervisor authorizing onboarding of the new user, the configuration task module 306 may create an account for the new user with a set of user credentials, in cooperation with the management module 101 or the like, may associate one or more applications (e.g., an application set) with the user, may purchase one or more software licenses from a third party for the user, or the like. The configuration task module 306 may email or otherwise notify the new user of the new user's credentials, of a process for accessing a computer desktop environment, or the like. The management module 101 and/or an endpoint module 102 may provide an instance of a computer desktop environment to the new user in response to the new user providing the set of user credentials assigned by the configuration task module 306. In this manner, instead of waiting hours, days, weeks, or longer for a new user to be manually onboarded, in certain embodiments, the configuration task module 306 may onboard a new user in a matter of minutes.

In one embodiment, one of the automated, executable tasks provided by the configuration task module 306 comprises copying or sending one or more updated application data packages from the management module 101, from an endpoint module 102, or the like to another endpoint module 102. The configuration task module 306, for example, may synchronize or update application data at the one or more endpoint hardware devices 104 periodically, during off peak hours while the endpoint hardware devices 104 have a low load, in response to an application version update, in response to a user request (e.g., through the library provided by the configuration task module 306), in response to an application being added to the catalogue of the application catalogue module 304, and/or in response to another trigger.

In a further embodiment, one of the automated, executable tasks provided by the configuration task module 306 comprises sending a management message or other message to one or more different remote users (e.g., an entity's employees, a service provider's subscribers, or the like) through the computer desktop environments or instances thereof used by the different users. For example, the configuration task module 306 may provide a popup or notification (e.g., a push notification) from within a user's instance of a computer desktop interface, with a requested message, one or more buttons, links, or other GUI elements, or the like. In this manner, a manager or administrator, in certain embodiments, may communicate with multiple users, notify one or more users of a maintenance operation, request that a user logout and re-login (e.g., resuming the same session, starting a new session, or the like) to a different endpoint hardware device 104 (e.g., so that the endpoint hardware device 104 to which the user is currently logged in may be rebooted, for load leveling, or the like), or may otherwise provide a user with a message from within a remote computer desktop environment. In certain embodiments, the configuration task module 306 may provide an interface for a user to send a reply message from within the user's instance of the computer desktop environment, or the like.

The library of tasks of the configuration task module 306, in one embodiment, each comprise executable code, such as an executable script or other instructions, compiled computer code, or the like, to perform the associated task. The configuration task module 306, in certain embodiments, may comprise one or more runbook servers, an orchestration module which triggers or executes a task, or the like, which provides the library of tasks (e.g., automated, computer executable runbooks; a service catalog; or the like) to simplify and/or automate one or more workflows, such as the onboarding process described above, allowing an administrator or other user to perform the workflows, even with little or no information technology (IT) experience. In certain embodiments, the In one embodiment, the migration module 308 is configured to transfer a computer desktop environment, or instance thereof, between executing in a virtual machine of an endpoint hardware device 104 and executing natively on an endpoint hardware device 104 in response to a trigger. The trigger, in various embodiments, may include a request from a user, satisfying or failing to satisfy a predefined performance threshold (e.g., a CPU threshold, a volatile memory threshold, a quality-of-service (QoS) threshold), upgrading or downgrading a service level or subscription plan, or the like. In certain embodiments, the trigger is user selectable and/or configurable, and the migration module 308 may provide a configuration interface to receive user input defining a threshold or another trigger.

The migration module 308, in one embodiment, may notify a user of the migration, if the user is currently logged in. The migration module 308 may force the user to logout for the migration, may temporarily lock the user's computer desktop interface during the migration, or the like. The migration module 308 may copy certain application data from one endpoint non-volatile storage device 107 to another (e.g., from an endpoint hardware device executing a computer desktop environment in a virtual machine to an endpoint hardware device executing a computer desktop environment natively or vice versa) but may use the same user data, from one or more remote non-volatile storage devices 105 both before and after the migration.

Figure 4:
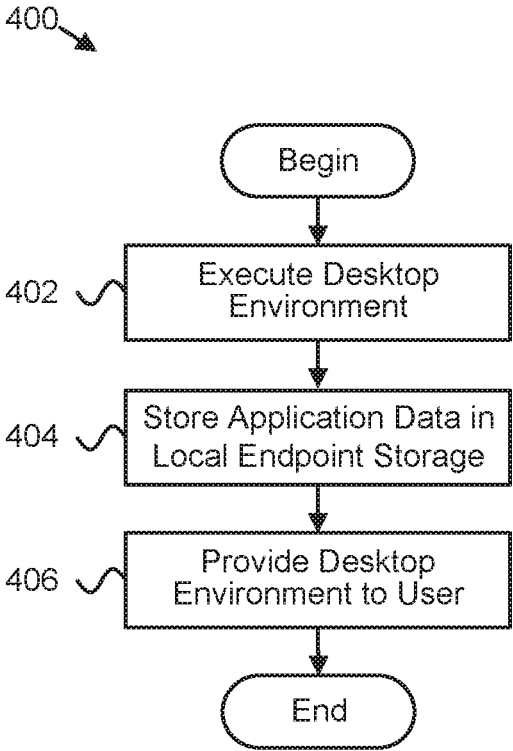
FIG. 4 is a schematic flowchart diagram illustrating one embodiment of a method for a computer desktop infrastructure.

FIG. 4 depicts one embodiment of a method 400 for a computer desktop infrastructure. The method 400 begins and the desktop module 202 executes 402 a computer desktop environment on a hardware device 104. The local storage module 204 stores 404 application data for the executed 402 computer desktop environment in local non-volatile storage 107 of the hardware device 104 executing 402 the computer desktop environment. The remote module 206 provides 406 the executed 402 computer desktop environment to a user 108 over a network 106 and the method 400 ends.

Figure 5:
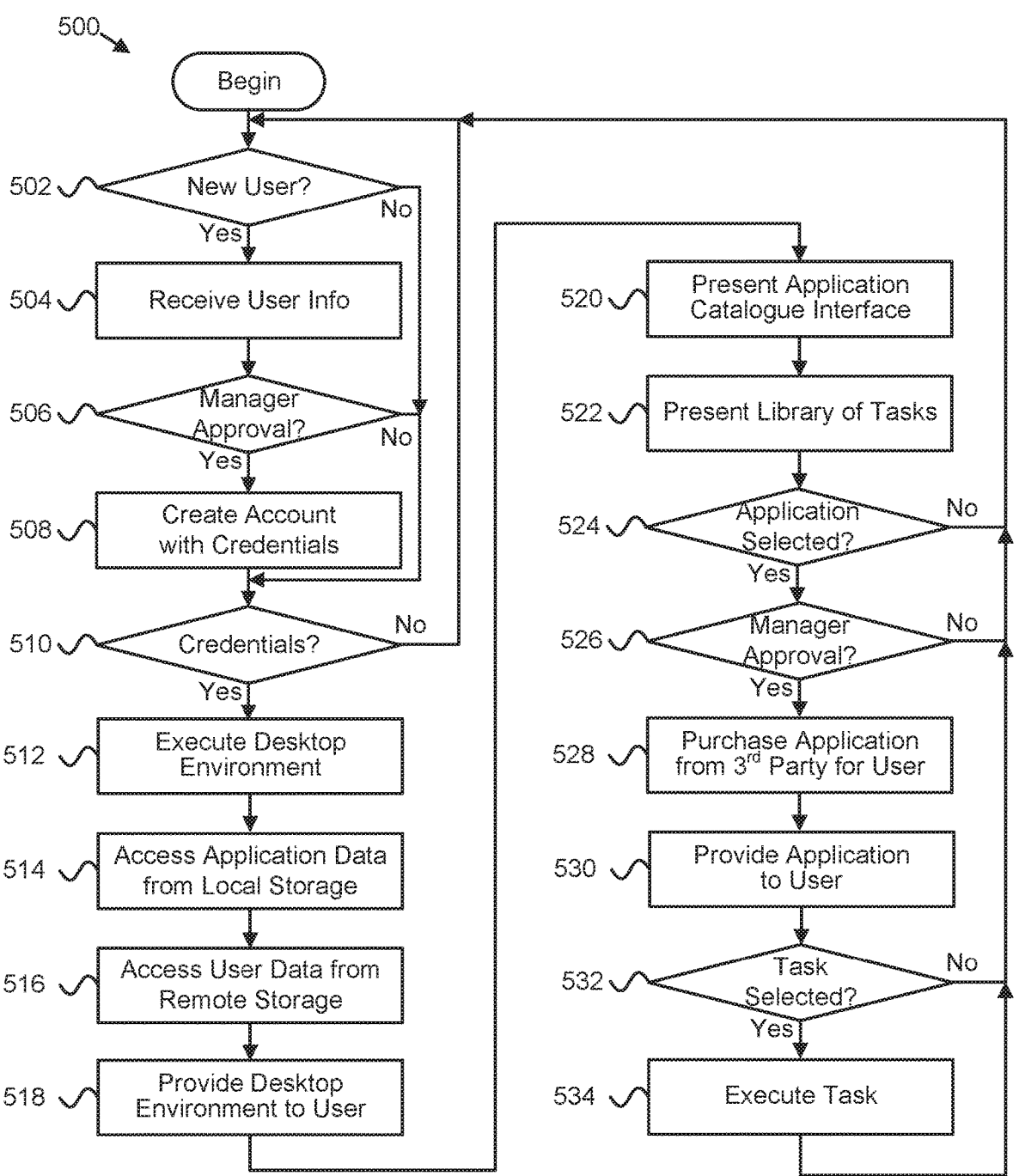
FIG. 5 is a schematic flowchart diagram illustrating another embodiment of a method for a computer desktop infrastructure.

FIG. 5 depicts one embodiment of a method 500 for a computer desktop infrastructure. The method 500 begins and the configuration task module 306 determines 502 whether the configuration task module 306 has received a request to onboard a new user of an instance of a computer desktop environment. If the configuration task module 306 determines 502 that no request has been received, the management module 101 continues to monitor 510 received user credentials. If the configuration task module 306 receives 502 a request for onboarding a new user, the configuration task module 306 receives 504 information for the new user, such as a name, a department, an email address, a user picture, and/or an application set for the new user.

The configuration task module 306 queries 506 a manager for authorization to onboard the new user. If the configuration task module 306 determines 506 that the manager has failed to authorize onboarding of the new user, the management module 101 continues to monitor 510 received user credentials. If the configuration task module 306 determines 506 that the manager has authorized onboarding of the new user, the configuration task module 306 creates 508 an account for the new user with a set of user credentials, in cooperation with the management module 101 or the like.

The management module 101 validates 510 and/or authenticates 510 any received credentials. If the management module 101 determines 510 that a set of received user credentials are not valid and/or authentic, the configuration task module 306 continues to monitor 502 for task requests, the management module 101 continues to monitor 510 received credentials, or the like. If the management module 101 determines 510 that a set of received user credentials are valid and/or authentic, the desktop module 202 executes 512 an instance of a desktop environment for the validated 510 user on an endpoint hardware device 104.

The local storage module 204 accesses 514 application data for the validated 510 user and the executed 512 desktop environment from local non-volatile storage 107 of the endpoint hardware device 104. The user data module 302 accesses 516 user data from highly accessible, redundant, remote non-volatile storage 105. The remote module 206 provides 518 the desktop environment to a user 108 over the data network 106.

The application catalogue module 304 presents 520 an application catalogue interface to the user. The configuration task module 306 presents 522 a library of tasks to the user. The application catalogue module 304 determines 524 whether the user has selected an application from the application catalogue interface. If the application catalogue module 304 determines 524 that the user has selected an application, the application catalogue module 304 queries 526 a manager for approval of the application purchase. The application catalogue module 304 purchases 528 the application from a third party for the user and provides 530 the application to the user in response to the application catalogue module 304 receiving 526 manager approval for the application.

The configuration task module 306 determines 536 whether a user has selected a task from the presented 522 library of tasks and executes 534 a selected task in response to determining that a user has selected the task, such as onboarding a new user, migrating the executed 512 desktop environment from executing in a virtual machine to execute natively on an endpoint hardware device 104, or the like. The configuration task module 306 may receive input data from a user in order to execute 534 the task, or the like. The method 500 continues and the configuration task module 306 continues to monitor 502 for task requests, the management module 101 continues to monitor 510 received credentials, or the like.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. An apparatus for a computer desktop infrastructure, the apparatus comprising:
a memory; and
a processor coupled with the memory and configured to cause the apparatus to:

execute a computer desktop environment on a hardware server device, the computer desktop environment associated with a user;

provide the computer desktop environment to the user over a network;

store data associated with the user in highly available, redundant storage that is remote to the hardware server device executing the computer desktop environment;

cache a redundant copy of at least a portion of the user data in one or more storage devices local to the hardware server device executing the computer desktop environment, the data associated with the user comprising user settings, user preferences, or a combination thereof;

store application data for the computer desktop environment in local non-volatile storage of the hardware server device executing the computer desktop environment;

detect a trigger associated with migrating the computer desktop environment from a virtual machine of the hardware server device to executing natively without virtualization on an endpoint hardware device associated with the user, the trigger defined via a configuration interface and comprising a request from a user, satisfying or failing to satisfy a predefined performance threshold, upgrading or downgrading a service level or subscription plan, or a combination thereof;

prevent the user from accessing the computer desktop environment on the virtual machine of the hardware server device during migration;

migrate the computer desktop environment from executing in the virtual machine of the hardware server device to executing natively without virtualization on the endpoint hardware device associated with the user in response to the trigger; and copy application data from the hardware server device executing the computer desktop environment in the virtual machine to the endpoint hardware device executing the computer desktop environment natively while continuing to use the data associated with the user from the redundant storage that is remote to the hardware server device.

2. The apparatus of claim 1, wherein the processor is configured to cause the apparatus to present an interface for the validated user to select an application for installing in the computer desktop environment, wherein the local storage module is configured to store the selected application in the local non-volatile storage of the hardware server device prior to selection of the application by the validated user, thereby expediting installation and execution of the selected application.

3. The apparatus of claim 2, wherein the processor is configured to cause the apparatus to query a supervisor of the user for authorization to purchase the selected application and to purchase a license for the selected application from a third party in response to receiving authorization from the supervisor.

4. The apparatus of claim 1, wherein the processor is configured to cause the apparatus to provide a library of one or more automated, executable tasks for managing different remote users of instances of the computer desktop environment.

5. The apparatus of claim 4, wherein one of the automated, executable tasks comprises an automated workflow for onboarding a new user of an instance of the computer desktop environment, including:

receiving one or more of a name, a department, an email address, a user picture, and an application set for the new user;

querying a manager for authorization to onboard the new user;

creating an account for the new user with a set of user credentials; and providing an instance of the computer desktop environment to the new user in response to the new user providing the set of user credentials.

6. The apparatus of claim 4, wherein one of the automated, executable tasks comprises sending a management message to one or more of the different remote users through the instances of the computer desktop environment.

7. The apparatus of claim 1, wherein the user data comprises one or more of a user's settings, a user's preferences, session information, user files, application settings, and logs.

8. The apparatus of claim 1, wherein the application data comprises computer executable program code of one or more applications for the computer desktop environment.

9. The apparatus of claim 8, wherein the one or more applications comprise user applications of the computer desktop environment.

10. The apparatus of claim 9, wherein the one or more applications comprise infrastructure for providing the computer desktop environment to a remote user.

11. The apparatus of claim 10, wherein the infrastructure comprises one or more of a virtual storage device file, a remote desktop services stack, a domain controller, a system configuration management server, a file server, and an application server.

12. A system for a computer desktop infrastructure, the system comprising:

a management server hardware device that validates computer desktop credentials for a plurality of different remote users;

a plurality of endpoint hardware devices each executing one or more instances of a computer desktop environment and storing application data for the one or more instances of the computer desktop environment in local non-volatile storage of the endpoint hardware devices to expedite execution of one or more selected applications and caching a redundant copy of at least a portion of user data for each of the plurality of different remote users in the local non-volatile storage of the endpoint hardware devices, the management server hardware handing off the validated users to the endpoint hardware devices and the endpoint hardware devices providing access to the one or more instances of the computer desktop environment; and one or more highly available, redundant non-volatile storage devices that are remote from the plurality of endpoint hardware devices and that store user data for the plurality of different remote users for use in the one or more instances of the computer desktop environment.

13. The system of claim 12, wherein the local non-volatile storage of the endpoint hardware devices does not store the user data for the plurality of users and the one or more remote non-volatile storage devices do not store the application data.

14. A method for a computer desktop infrastructure, the method comprising:

assigning, by a management server, a plurality of different remote users to one or more hardware devices executing a plurality of remotely accessible virtual desktop environments;

accessing application data of one or more user applications of the plurality of remotely accessible virtual desktop environments from local non-volatile storage of the one or more hardware devices executing the virtual desktop environments;

accessing user data for the plurality of different remote users of the plurality of remotely accessible virtual desktop environments from remote non-volatile storage that is not local to the one or more hardware devices such that each of the plurality of remotely accessible virtual desktop environments are associated with one of the plurality of different remote users and the user data for the plurality of different remote users is stored in the remote non-volatile storage that is remote from the one or more hardware devices executing the plurality of remotely accessible virtual desktop environments;

caching a redundant copy of at least a portion of the user data in the local non-volatile storage of the one or more hardware devices executing the virtual desktop environments;

providing the plurality of different remote users with remote access to the virtual desktop environments over a network; and installing one or more selected applications in the virtual desktop environments from the local non-volatile storage of the one or more hardware devices executing the virtual desktop environments prior to being selected by the plurality of different remote users.

15. The method of claim 14, further comprising migrating at least one of the remotely accessible virtual desktop environments from executing in a virtual machine to execute natively on one of the one or more hardware devices.

16. The method of claim 14, further comprising executing an automated, executable task to onboard a new user, the executable task comprising:

receiving one or more of a name, a department, an email address, a user picture, and an application set for the new user;

querying a manager for authorization to onboard the new user;

creating an account for the new user with a set of user credentials; and providing one of the remotely accessible virtual desktop environments to the new user in response to the new user providing the set of user credentials.

* * * * *